Dec. 13, 1938.   A. J. FAUSEK ET AL   2,139,888
HOSE STRUCTURE
Filed Aug. 10, 1936
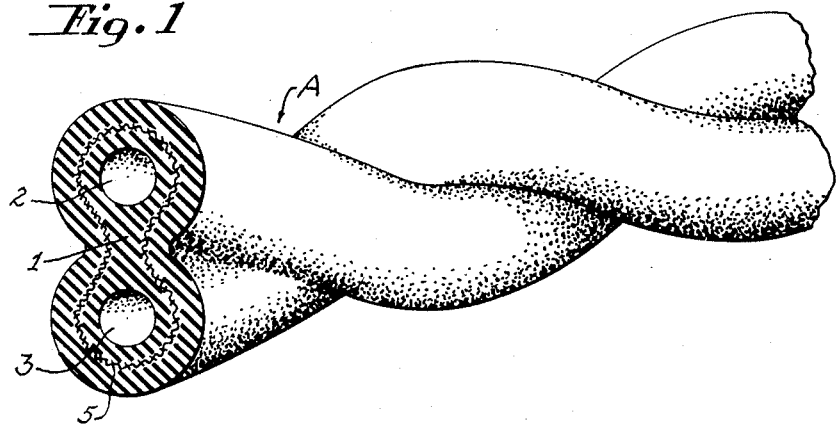
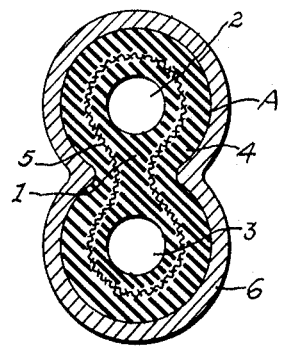
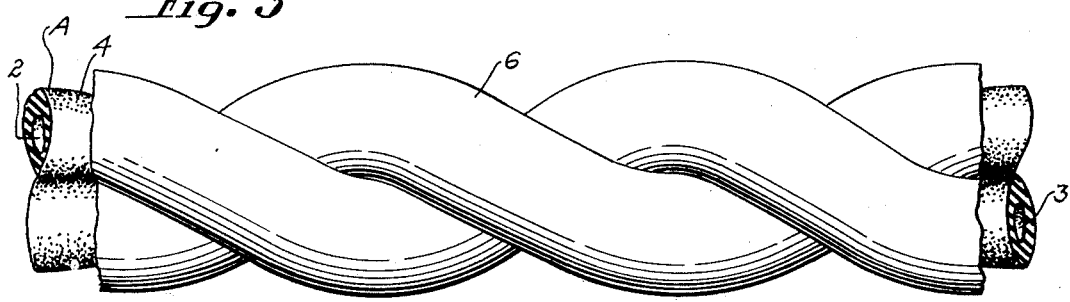
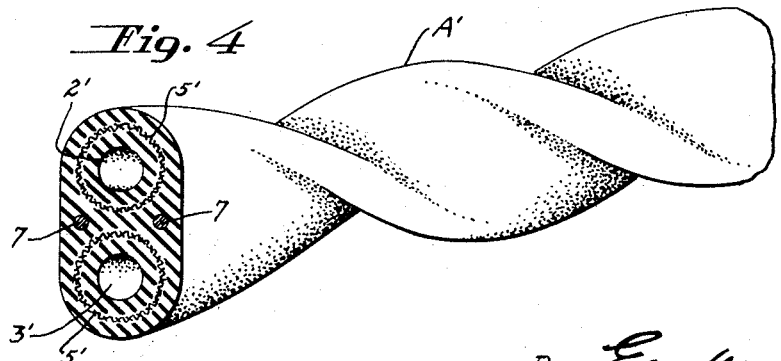
INVENTORS
A. J. FAUSEK
I. F. FAUSEK
BY
ATTORNEY Patented Dec. 13, 1938

2,139,888

UNITED STATES PATENT OFFICE 2,139,888

HOSE STRUCTURE

Arthur J. Fausek and Irwing F. Fausek,
Clayton, Mo.

Application August 10, 1936, Serial No. 95,150

3 Claims. (Cl. 138—49)

This invention relates generally to hose structures, and more specifically to a hose structure provided with a plurality of passageways formed therethrough, the predominant object of the invention being to provide an improved hose structure of this type which, because of its novel construction and arrangement, is capable of performing its intended function in a highly efficient manner.

It is quite generally known that in the use of oxyacetylene welding and cutting torches oxygen and fuel gas are conducted from tanks to the torches through hoses, and heretofore separate and entirely independent hoses were employed with a torch for conducting oxygen and fuel gas thereto. These independent hoses are very flexible, and because they are permitted to swing about without restraint they constitute a nuisance to users of the torches. At first thought it may seem a simple matter to tape the hoses of a torch together so as to prevent free, independent movement of the hoses with respect to each other, or to produce a single hose body in which two passageways were provided, one for oxygen and the other for fuel gas. However, if this be done it will be found that the resultant structure would be quite stiff in one transverse direction, and very flexible in another transverse direction. In other words, the degree of flexibility of the hose so produced would not be uniform throughout the hose and in all directions of movement thereof, and this would interfere with free and uniform movement of the associated torch. Another disadvantage of such an arrangement as that described is that if the fluid passing through one of the passageways of a hose were under higher pressure than the fluid passing through the companion passageway of the hose, the differential in pressures would cause the hose to be bowed.

In view of the foregoing, we have devised the improved hose disclosed herein which, briefly stated, comprises a body portion formed of rubber, or a combination of rubber and fabric, through which a plurality of passageways are formed. The body portion, when viewed in cross-section, is of elongated shape and therefore much more material is present in the elongated cross-sectional dimension than in the dimension which is extended at a right angle to said elongated cross-sectional dimension. Normally the structure as thus far described would be much stiffer in the direction of the elongated cross-sectional dimension than in the direction at a right angle to said elongated cross-sectional dimension, but this situation is cured in accordance with the present invention by twisting the hose structure about its axis so as to cause portions of the body portion of the hose and the passageways therein to follow spiral paths about the axis of the hose. the invention contemplating the curing of the hose in its twisted condition so that the hose will be permanently retained in its twisted condition.

By twisting the hose in the manner described, the elongated, stiffer cross-sectional dimension of the hose extends about the axis of the hose and longitudinally thereof, and therefore the stiffness is so distributed throughout the transverse and longitudinal dimensions of the hose that the hose is of uniform stiffness throughout. Also, when the hose is twisted as described and fluids of higher and lower pressures are passed through the passageways of the hose, there will be no bowing of the hose, as the higher pressure fluid is not at one side of the hose only, but instead said higher pressure fluid moves spirally about the axis of the hose and thereby distributes the hose-bowing tendency of the higher pressured fluid in all directions.

Fig. 1 is a sectional perspective of a section of hose made in accordance with this invention.

Fig. 2 is a cross-sectional view showing the improved hose in the course of production.

Fig. 3 is a fragmentary side elevation of the structure shown in Fig. 2.

Fig. 4 is a sectional perspective illustrating another form of the invention.

In the drawing, wherein are shown for the purpose of illustration, merely, two forms of the invention, A designates in Figs. 1, 2, and 3 the improved hose generally. The hose A comprises a rubber core 1, which in cross-section is of elongated formation, as shown in Figs. 1 and 2, and formed through said core at points adjacent to the opposite ends thereof is a passageway 2 and a passageway 3. The hose A includes an outer rubber cover 4, and interposed between the outer rubber and the core of the hose is a layer of fabric 5.

The improved hose disclosed herein may be made in accordance with the method of making ordinary hose; that is to say, said improved hose may be formed in an untwisted condition within a jacket 6 of lead or other suitable material. After the hose has been formed within the jacket and before the hose is cured the entire, combined structure, that is, the hose and the jacket, are twisted in any suitable manner about the axis of the hose, as shown in Fig. 3. After the hose and the jacket have been twisted as described, the hose is cured in its twisted condition within the twisted jacket, and upon completion of the hose-curing operation the jacket is slit or cut from the hose, leaving a twisted and cured hose which is provided with spirally extended portions and passageways and has all of the desirable characteristics referred to above.

In Fig. 4 is illustrated a twisted hose structure A' that includes a pair of electrical conductors 7. The hose is formed with the conductors in place therein, and the conductors are employed as parts of an electrical ignition system of the torch with which the hose A' is associated, and said conductors extend spirally through the hose A' just as do the passageways 2' and 3'.

It is obvious, of course, that the passageways formed through the hose A and the hose A' will be provided with short extensions (not shown) which at one end of the hose will lead to an oxygen tank and to a fuel gas tank, and at the opposite end of the hose will lead to different parts of the torch. In like manner the electrical conductor 7 of Fig. 4 will be provided with extensions at opposite ends of the hose which lead to the source of electrical energy and to parts of the torch.

It is obvious that the fabric may be arranged within the hose structure in various ways, for instance, as shown in Figs. 1 and 2, or as shown in Fig. 4, wherein the fabric is designated by the reference character 5'. Also, while it has been hereinbefore stated that the combined structure of the hose and jacket is twisted after the jacket has been applied to the untwisted hose, it is pointed out that the twisting action may be obained while the jacket is being formed on the hose structure.

We claim:

1. A hose comprising a unitary, integral body portion twisted longitudinally about its axis so as to cause portions of said body portion to extend spirally and longitudinally of its axis, said body portion being permanently set in its twisted and spiral condition so that it retains such formation at all time and being provided with passageways formed therethrough which also extend spirally and longitudinally of the axis of said body portion.

2. A hose comprising a unitary, integral body portion of elongated cross-sectional formation, said body portion being twisted longitudinally about its axis so as to cause portions of said body portion to extend spirally and longitudinally of its axis, said body portion being permanently set in its twisted and spiral condition so that it retains such formation at all time and being provided with passageways formed therethrough which also extend spirally and longitudinally of the axis of said body portion.

3. A hose comprising a unitary, integral body portion of elongated cross-sectional formation, said body portion being twisted longitudinally about its axis so as to cause portions of said body portion to extend spirally and longitudinally of its axis, said body portion being permanently set in its twisted and spiral condition so that it retains such formation at all time and being provided with passageways formed therethrough which also extend spirally and longitudinally of the axis of said body portion, and electrical conductors embedded in said body portion of the hose which likewise extend spirally and longitudinally of the axis of said body portion.

ARTHUR J. FAUSEK.
IRWING F. FAUSEK.